United States Patent
Keller et al.

(10) Patent No.: US 10,324,530 B2
(45) Date of Patent: Jun. 18, 2019

(54) HAPTIC DEVICES THAT SIMULATE RIGIDITY OF VIRTUAL OBJECTS

(71) Applicant: Facebook Technologies, LLC, Menlo Park, CA (US)

(72) Inventors: Sean Jason Keller, Kirkland, WA (US); Tristan Thomas Trutna, Seattle, WA (US); Nicholas Roy Corson, Mukilteo, WA (US); Garett Andrew Ochs, Seattle, WA (US); Raymond King, Redmond, WA (US); Elia Gatti, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 25 days.

(21) Appl. No.: 15/377,166

(22) Filed: Dec. 13, 2016

(65) Prior Publication Data
US 2017/0168576 A1    Jun. 15, 2017

Related U.S. Application Data

(60) Provisional application No. 62/267,151, filed on Dec. 14, 2015.

(51) Int. Cl.
*G06F 3/01* (2006.01)

(52) U.S. Cl.
CPC .............. *G06F 3/016* (2013.01); *G06F 3/014* (2013.01)

(58) Field of Classification Search
USPC ........................................................ 356/156
See application file for complete search history.

(56) References Cited

U.S. PATENT DOCUMENTS

| | | | | |
|---|---|---|---|---|
| 5,734,373 A | * | 3/1998 | Rosenberg | A63F 13/06 345/161 |
| H002017 H | * | 4/2002 | Repperger | 345/161 |
| 6,552,722 B1 | * | 4/2003 | Shih | G06F 3/016 345/419 |
| 9,030,307 B1 | * | 5/2015 | Lee | G06F 3/017 340/407.1 |
| 9,268,401 B2 | * | 2/2016 | Provancher | G06F 3/016 |
| 2006/0115348 A1 | * | 6/2006 | Kramer | G06F 3/011 414/5 |
| 2009/0250267 A1 | * | 10/2009 | Heubel | G06F 3/016 178/18.03 |
| 2012/0105333 A1 | * | 5/2012 | Maschmeyer | G06F 3/016 345/173 |
| 2013/0093703 A1 | * | 4/2013 | Yang | G06F 3/014 345/173 |
| 2013/0151960 A1 | * | 6/2013 | Wiertlewski | G06F 3/015 715/702 |
| 2016/0274662 A1 | * | 9/2016 | Rimon | G06F 3/014 |

(Continued)

*Primary Examiner* — Bryan Earles
(74) *Attorney, Agent, or Firm* — Fenwick & West LLP

(57) ABSTRACT

Embodiments relate to a system and a method for providing haptic feedback to a user by controlling an area of a surface of a haptic assembly in touch (directly or indirectly) with a user. The haptic assembly can be actuated such that a surface area of the haptic assembly in contact with a user can be adjusted. An area of the haptic assembly in contact with a user can be changed by modifying a shape of the haptic assembly. Hence, by changing the shape of the haptic assembly, a user touching a virtual object in a virtual space with a particular rigidity can be emulated.

20 Claims, 5 Drawing Sheets

(56) References Cited

U.S. PATENT DOCUMENTS

2016/0358428 A1\* 12/2016 Provancher ............ G06F 3/016
2016/0363997 A1\* 12/2016 Black ..................... G06F 3/014
2017/0212589 A1\* 7/2017 Domenikos ............ G06F 3/014
2017/0262056 A1\* 9/2017 Osman ................... G06F 3/014

\* cited by examiner

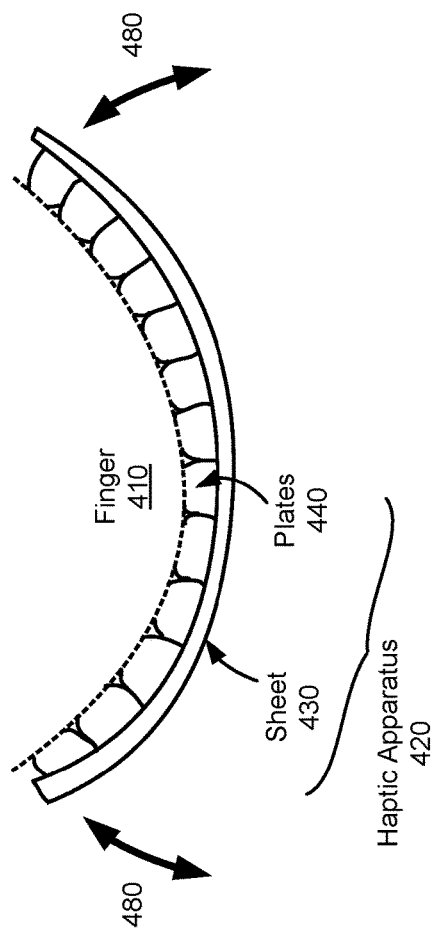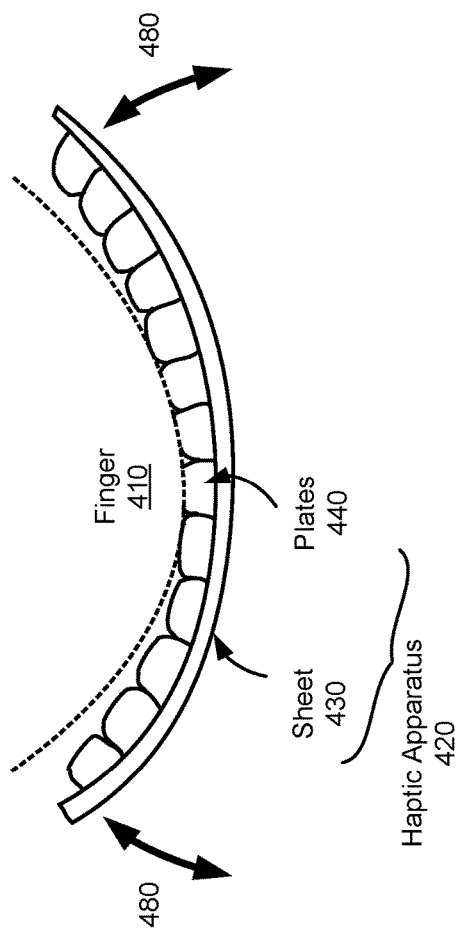

HAPTIC DEVICES THAT SIMULATE RIGIDITY OF VIRTUAL OBJECTS

CROSS REFERENCE TO RELATED APPLICATION

This application claims priority to and the benefit of U.S. Provisional Patent Application No. 62/267,151 filed on Dec. 14, 2015, which is incorporated by reference in its entirety.

BACKGROUND

The present disclosure generally relates to a system for providing haptic feedback to a user, and specifically to haptic devices that simulate rigidity of virtual objects.

Virtual reality (VR) is a simulated environment created by computer technology and presented to a user, such as through a VR system. Typically, a VR system includes a VR headset that provides visual and audio information to the user. Conventional VR systems create virtual hands in the simulated environment and use a hand tracking system to track motion and positions of the user's hands. However, such systems do not provide the user any feedback (e.g., to indicate touching a surface) at the user's hands as the user's virtual hands interact with virtual objects.

SUMMARY

Embodiments relate to a system and a method for providing haptic feedback to a user by controlling an area of a surface of a haptic assembly in touch (directly or indirectly) with a user. The amount of surface area in contact with a user can be perceived as a measure of rigidity. For example, a hard material when touched by a user has little give (i.e., minimal deformation). In contrast, a soft material may give substantially when touched by the user using the same amount of pressure, and accordingly, a user's finger will be in contact with a larger surface area of a soft material than a hard material. In order to emulate a user touching a material of a particular rigidity, the haptic assembly can be actuated such that a surface area of the haptic assembly in contact with a user can be adjusted. An area of the haptic assembly in contact with a user can be changed by modifying a shape of the haptic assembly. Hence, by changing the shape of the haptic assembly, a user touching a virtual object in a virtual space with a particular rigidity can be emulated. Emulating herein refers to providing a tactile perception to a user that the user is in physical contact with a virtual object of a particular rigidity.

In one embodiment, the system includes a haptic glove for providing haptic feedback. The haptic glove includes haptic apparatuses coupled to one or more fingers of the glove, an actuator, and one or more tendons that couple the actuator to the haptic apparatuses. A shape of one or more haptic apparatuses can be transformed to change an area in contact with a part of a user (e.g., a user's hand, a fingertip, etc.). The actuator controls the transformation of the shape of the one or more haptic apparatuses through one or more tendons coupled between the one or more haptic apparatuses and the actuator.

In one aspect, the haptic glove is implemented in a VR system for providing VR experience and/or augmented reality experience to a user. The VR system includes a head mounted display for presenting an image of a virtual environment to the user according to positional information of the head mounted system. In addition, the VR system includes the haptic glove for providing haptic feedback to a user. The VR system updates the image of the 3-D virtual environment according to a positional information of the head mounted display and/or haptic glove. The VR system also provides haptic feedback to the user via the haptic glove. The haptic glove with the one or more amenable haptic assembly disclosed herein can provide haptic feedback simulating different levels of rigidity to emulate a user contacting virtual objects of different materials. Hence, the user can perceive a feeling of touching an imaginary object with certain rigidity, and enjoy a better immersive VR experience.

BRIEF DESCRIPTION OF THE DRAWINGS

FIG. 4A illustrates a cross section view of a haptic apparatus emulating a surface associated with a low rigidity, according to an embodiment.

FIG. 4B illustrates a cross section view of a haptic apparatus emulating a surface associated with a high rigidity, according to an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
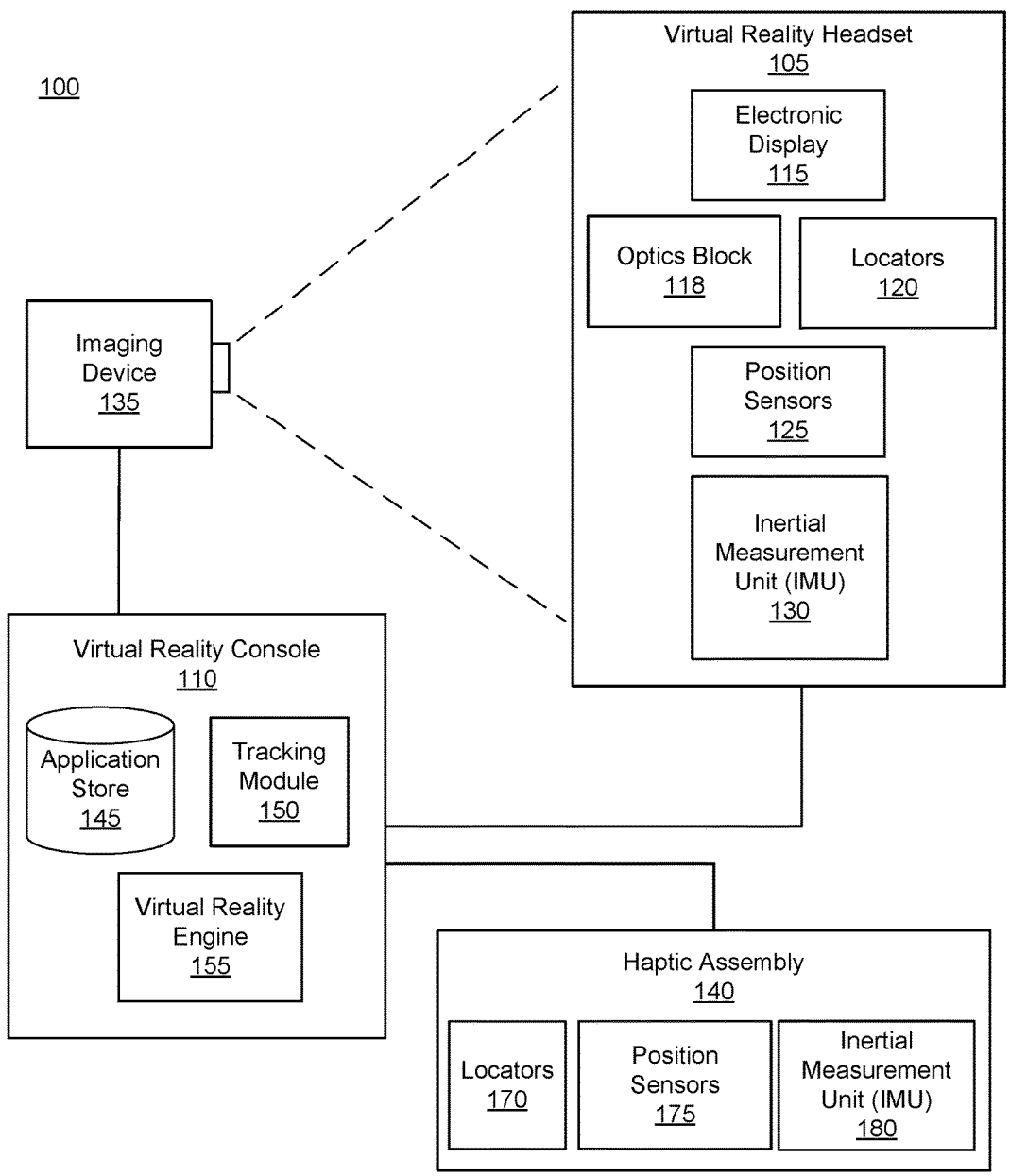
FIG. 1 is a block diagram of a system environment including a VR system, in accordance with an embodiment.

FIG. 1 is a block diagram of a VR system environment 100 in which a VR console 110 operates. The system environment 100 shown by FIG. 1 comprises a VR headset 105, an imaging device 135, and a haptic assembly 140. While FIG. 1 shows an example system 100 including one VR headset 105, one imaging device 135, and one haptic assembly 140 (e.g., a haptic glove), in other embodiments any number of these components may be included in the system 100. For example, there may be multiple VR headsets 105 each having an associated haptic assembly 140 and being monitored by one or more imaging devices 135, with each VR headset 105, haptic assembly 140, and imaging devices 135 communicating with the VR console 110. In alternative configurations, different and/or additional components may be included in the system environment 100. Similarly, the functions can be distributed among the components in a different manner than is described here. For example, some or all of the functionality of the VR console 110 may be contained within the VR headset 105.

The VR headset 105 is a head-mounted display that presents media to a user. Examples of media presented by the VR headset include one or more images, video, audio, or any combination thereof. In some embodiments, audio is presented via an external device (e.g., speakers and/or headphones) that receives audio information from the VR headset 105, the VR console 110, or both, and presents audio data based on the audio information. In some embodiments, the VR headset 105 may also act as an augmented reality (AR) headset. In these embodiments, the VR headset 105 augments views of a physical, real-world environment with computer-generated elements (e.g., images, video, sound, etc.).

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110.

The optics block 118 magnifies received light from the electronic display 115, corrects optical errors associated with the image light, and the corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

The locators 120 are objects located in specific positions on the VR headset 105 relative to one another and relative to a specific reference point of the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data (herein also referred to as "fast calibration information") of the VR headset 105 based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data of the VR headset 105 indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll) of the VR headset 105. In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point of the VR headset 105. Alternatively, the IMU 130 provides the sampled measurement signals to the VR console 110, which determines the fast calibration data of the VR headset 105. The reference point of the VR headset 105 is a point that may be used to describe the position of the VR headset 105. While the reference point of the VR headset 105 may generally be defined as a point in space; however, in practice the reference point of the VR headset 105 is defined as a point within the VR headset 105 (e.g., a center of the IMU 130).

The IMU 130 receives one or more calibration parameters of the VR headset 105 from the VR console 110. As further discussed below, the one or more calibration parameters of the VR headset 105 are used to maintain tracking of the VR headset 105. Based on a received calibration parameter of the VR headset 105, the IMU 130 may adjust one or more IMU parameters (e.g., sample rate). In some embodiments, certain calibration parameters of the VR headset 105 cause the IMU 130 to update an initial position of the reference point of the VR headset 105 so it corresponds to a next calibrated position of the reference point of the VR headset 105. Updating the initial position of the reference point of the VR headset 105 as the next calibrated position of the reference point of the VR headset 105 helps reduce accumulated error associated with the determined estimated position. The accumulated error, also referred to as drift error, causes the estimated position of the reference point of the VR headset 105 to "drift" away from the actual position of the reference point of the VR headset 105 over time.

The haptic assembly 140 is an apparatus for providing haptic feedback to the user. The haptic assembly 140 includes locators 170, one or more position sensors 175, and an inertial measurement unit (IMU) 180. In some embodiments, the locators 170, one or more position sensors 175, an inertial measurement unit (IMU) 180 are employed to determine a position or movement of the haptic assembly 140. In addition, the haptic assembly 140 receives, from the VR console 110, a haptic feedback signal corresponding to haptic feedback emulating a user contacting a virtual object with certain rigidity. The haptic assembly 140 provides tactile perception including a rigidity of a virtual object to a user in accordance with the haptic feedback signal received from the VR console 110.

In one embodiment, the haptic feedback signal indicates a position or a portion of the haptic assembly 140 to be actuated and a rigidity of a virtual object in contact with the haptic assembly 140 for providing haptic feedback. In this embodiment, the haptic assembly 140 determines an amount of actuation to be provided corresponding to the rigidity of the virtual object indicated by the haptic feedback signal, and provides tactile perception including a rigidity of a virtual object to a user at the position or portion of the haptic assembly 140 according to the determined amount.

In another embodiment, the haptic feedback signal indicates a position or a portion of the haptic assembly 140 to be actuated, and an amount of actuation of the position or the portion of the haptic assembly 140 for providing haptic feedback. In this embodiment, the amount of actuation is determined by, e.g., the VR console 110, according to a rigidity of a virtual object in contact with the haptic assembly 140. The haptic assembly 140 provides tactile perception including a rigidity of a virtual object to a user at the position or portion of the haptic assembly 140 according to the amount of actuation indicated by the haptic feedback signal.

The locators 170 are objects located in specific positions on the haptic assembly 140 relative to one another and relative to a specific reference point of the haptic assembly 140 on the haptic assembly 140. A locator 170 is substantially similar to a locator 120 except that a locator 170 is part of the haptic assembly 140. Additionally, in some embodiments, the outer surface or other portions of the haptic assembly 140 are opaque in the visible band of wavelengths of light. Thus, the locators 170 may emit light in the IR band under an outer surface that is transparent in the IR band but opaque in the visible band.

A position sensor 175 generates one or more measurement signals in response to motion of the haptic assembly 140. The position sensors 175 are substantially similar to the positions sensors 125, except that the position sensors 175 are part of the haptic assembly 140. The position sensors 175 may be located external to the IMU 180, internal to the IMU 180, or some combination thereof.

Based on the one or more measurement signals from one or more position sensors 175, the IMU 180 generates fast calibration data of the haptic assembly 140 indicating an estimated position of the haptic assembly 140 relative to an initial position of the haptic assembly 140. For example, the position sensors 175 include multiple accelerometers to measure translational motion (forward/back, up/down, left/right) and multiple gyroscopes to measure rotational motion (e.g., pitch, yaw, roll) of the haptic assembly 140. In some embodiments, the IMU 180 rapidly samples the measurement signals and calculates the estimated position of the haptic assembly 140 from the sampled data. For example, the IMU 180 integrates the measurement signals received from the accelerometers over time to estimate a velocity vector and integrates the velocity vector over time to determine an estimated position of a reference point of the haptic assembly 140. Alternatively, the IMU 180 provides the sampled measurement signals to the VR console 110, which determines the fast calibration data of the haptic assembly 140. The reference point of the haptic assembly 140 is a point that may be used to describe the position of the haptic assembly 140. While the reference point of the haptic assembly 140 may generally be defined as a point in space; however, in practice the reference point of the haptic assembly 140 is defined as a point within the haptic assembly 140 (e.g., a center of the IMU 180).

The IMU 180 receives one or more calibration parameters of the haptic assembly 140 from the VR console 110. As further discussed below, the one or more calibration parameters of the haptic assembly 140 are used to maintain tracking of the haptic assembly 140. Based on a received calibration parameter of the haptic assembly 140, the IMU 180 may adjust one or more IMU parameters (e.g., sample rate). In some embodiments, certain calibration parameters of the haptic assembly 140 cause the IMU 180 to update an initial position of the reference point of the haptic assembly 140 so it corresponds to a next calibrated position of the reference point of the haptic assembly 140. Updating the initial position of the reference point of the haptic assembly 140 as the next calibrated position of the reference point of the haptic assembly 140 helps reduce accumulated error associated with the determined estimated position.

The haptic assembly 140 provides haptic feedback including a rigidity of a virtual object in contact. In one embodiment, the haptic assembly 140 includes a malleable sheet. The shape of the haptic assembly 140 can be transformed to change an area of the malleable sheet in contact (directly or indirectly) with a user. In one embodiment, the haptic assembly 140 actuates the malleable sheet according to the haptic feedback signal for providing haptic feedback including a rigidity of a virtual object in contact with a user. Different embodiments, of the haptic assembly 140 and its operation are described in detail below with respect to FIGS. 2-4.

In one embodiment, the haptic assembly 140 is a haptic glove through which the VR console 110 can detect a user hand movement and provide tactile perception to the user hand. Moreover, the haptic glove receives a haptic feedback signal indicating a rigidity of a virtual object (or an amount of actuation to be applied corresponding to a rigidity of the virtual object) from the VR console 110, and then provides haptic feedback reflecting the rigidity of the virtual object to the user accordingly. As described in detail with respect to FIGS. 2 through 4.

The imaging device 135 generates slow calibration data in accordance with calibration parameters received from the VR console 110. Slow calibration data (herein also referred to as "slow calibration information") of the VR headset includes one or more images showing observed positions of the locators 120 associated with the VR headset 105 that are detectable by the imaging device 135. Similarly, slow calibration data of the haptic assembly 140 includes one or more images showing observed positions of the locators 170 associated with the haptic assembly 140 that are detectable by the imaging device 135. In one aspect, the slow calibration data includes one or more images of both the VR headset 105 and haptic assembly 140. The imaging device 135 may include one or more cameras, one or more video cameras, any other device capable of capturing images including one or more of the locators 120 and 170, or any combination thereof. Additionally, the imaging device 135 may include one or more filters (e.g., used to increase signal to noise ratio). The imaging device 135 is configured to detect light emitted or reflected from locators 120 and 170 in a field of view of the imaging device 135. In embodiments where the locators 120 and 170 include passive elements (e.g., a retroreflector), the imaging device 135 may include a light source that illuminates some or all of the locators 120 and 170, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR console 110 provides media to the VR headset 105 for presentation to the user in accordance with information received from one or more of: the imaging device 135, the VR headset 105, and the haptic assembly 140. The VR console 110 may also instruct the haptic assembly 140 to provide haptic feedback including rigidity of a virtual object in contact with a user. In the example shown in FIG.

1, the VR console 110 includes a rigidity store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The rigidity store 145 stores rigidity levels of different virtual objects as a look up table that can be accessed by the VR console 110 when executing one or more applications. The rigidity of a virtual object may be described according to a selected rigidity level from a predetermined set of rigidity levels. The predetermined set of rigidity levels may be obtained, for example, based on Rockwell hardness scale. Different rigidity levels may be assigned to different virtual objects according to empirical experiments. For example, virtual rubber may have a low rigidity level assigned (e.g., '10' out of '100'), whereas virtual steel may have a high rigidity level assigned (e.g., '85' out of '100'). In one example, the highest rigidity level (e.g., '100') corresponds to a configuration of the haptic assembly 140 causing a maximum actuation (e.g., minimum contact with the user) possible for the haptic assembly 140. In another example, the lowest rigidity level (e.g., '0') corresponds to a configuration of the haptic assembly 140 causing a minimum actuation (e.g., maximum contact with the user) possible for the haptic assembly 140. Intermediate rigidity levels correspond to configurations of the haptic assembly 140 causing corresponding amount of actuation of the haptic assembly 140 between the maximum actuation and the minimum actuation.

The tracking module 150 calibrates the VR system 100 using one or more calibration parameters and may adjust one or more calibration parameters to reduce error in determination of the position of the VR headset 105 and/or the haptic assembly 140.

The tracking module 150 tracks movements of the VR headset 105 using slow calibration information of the VR headset 105 from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information of the VR headset 105. Additionally, in some embodiments, the tracking module 150 may use portions of the fast calibration information, the slow calibration information, or some combination thereof of the VR headset 105, to predict a future location of the headset 105. The tracking module 150 provides the estimated or predicted future position of the VR headset 105 to the VR engine 155.

In addition, the tracking module 150 tracks movements of the haptic assembly 140 using slow calibration information of the haptic assembly 140 from the imaging device 135. The tracking module 150 determines positions of a reference point of the haptic assembly 140 using observed locators from the slow calibration information and a model of the haptic assembly 140. The tracking module 150 also determines positions of a reference point of the haptic assembly 140 using position information from the fast calibration information of the haptic assembly 140. Additionally, in some embodiments, the tracking module 150 may use portions of the fast calibration information, the slow calibration information, or some combination thereof of the haptic assembly 140, to predict a future location of the haptic assembly 140. The tracking module 150 provides the estimated or predicted future position of the haptic assembly 140 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to detecting a motion of the haptic assembly 140 and provides feedback to the user that the action was performed. In one example, the VR engine 155 instructs the VR headset 105 to provide visual or audible feedback to the user. In another example, the VR engine 155 instructs the haptic assembly 140 to provide haptic feedback including a rigidity of a virtual object to the user.

In addition, the VR engine 155 receives position information, acceleration information, velocity information, predicted future positions, or some combination thereof of the haptic assembly 140 from the tracking module 150 and determines whether a virtual touch event occurred. A virtual touch event herein refers to an event of a user contacting a virtual object in a virtual space. For example, an image of a virtual object is presented to the user on the VR headset 105. Meanwhile, the VR engine 155 collectively analyzes positions of multiple sensors of the haptic assembly 140 through the tracking module 150, and generates a three dimensional mapping of the haptic assembly 140 describing the position and the shape of the haptic assembly 140. The three dimensional mapping of the haptic assembly 140 describes coordinates of various parts of the haptic assembly 140 in a virtual space corresponding to physical positions of the parts of the haptic assembly 140 in reality. Responsive to the user performing an action to grab the virtual object or the user being contacted by the virtual object, the VR engine 155 determines that the virtual touch event occurred.

In one embodiment, the VR engine 155 compares coordinates of a virtual object and a coordinate of the haptic assembly 140 in a virtual space to determine whether a virtual touch event occurred. The VR engine 155 obtains a coordinate of the virtual object in a virtual space, in accordance with an image presented via the VR headset 105. Additionally, the VR engine 155 obtains a coordinate of the haptic assembly 140 (e.g., haptic glove) corresponding to a physical position of the VR haptic assembly 140 from the tracking module 150 or the three dimensional mapping of the haptic assembly 140. Then, the VR engine 155 compares the coordinate of the virtual object in the virtual space and the coordinate of the haptic assembly 140 in the virtual space. For example, if two coordinates of the virtual object and the haptic assembly 140 overlap or are approximate to each other within a predetermined distance for a predetermined amount of time (e.g., 1 second), the VR console 110 determines the virtual touch event occurred.

In one embodiment, the VR engine 155 generates a haptic feedback signal in responsive to the virtual touch event detected. Responsive to detecting the virtual touch event, the VR engine 155 determines a rigidity of the virtual object in contact with the user. In one aspect, the haptic feedback signal indicates which portion (e.g., a coordinate or a position) of the haptic assembly 140 to provide haptic feedback and the rigidity of the virtual object. The VR engine 155 obtains the predetermined rigidity corresponding to the virtual object from the rigidity store 145. For example, the VR engine 155 determines which virtual object is in contact with the user (e.g., a ball, a pillow, a piece of wood, etc.) and obtains the rigidity corresponding to the determined virtual object from the rigidity store 145. Moreover, the VR engine 155 determines which part of the virtual object is in contact (e.g., an index finger), and generates the haptic feedback signal accordingly. In another aspect, the VR engine 155 determines an amount of actuation corresponding to the rigidity level, and generates the haptic feedback signal indicating the determined amount of actuation instead of the rigidity level. The VR engine 155 provides the haptic feedback signal to the haptic assembly 140 for executing the haptic feedback.

Example Haptic Feedback Device

Figure 2:
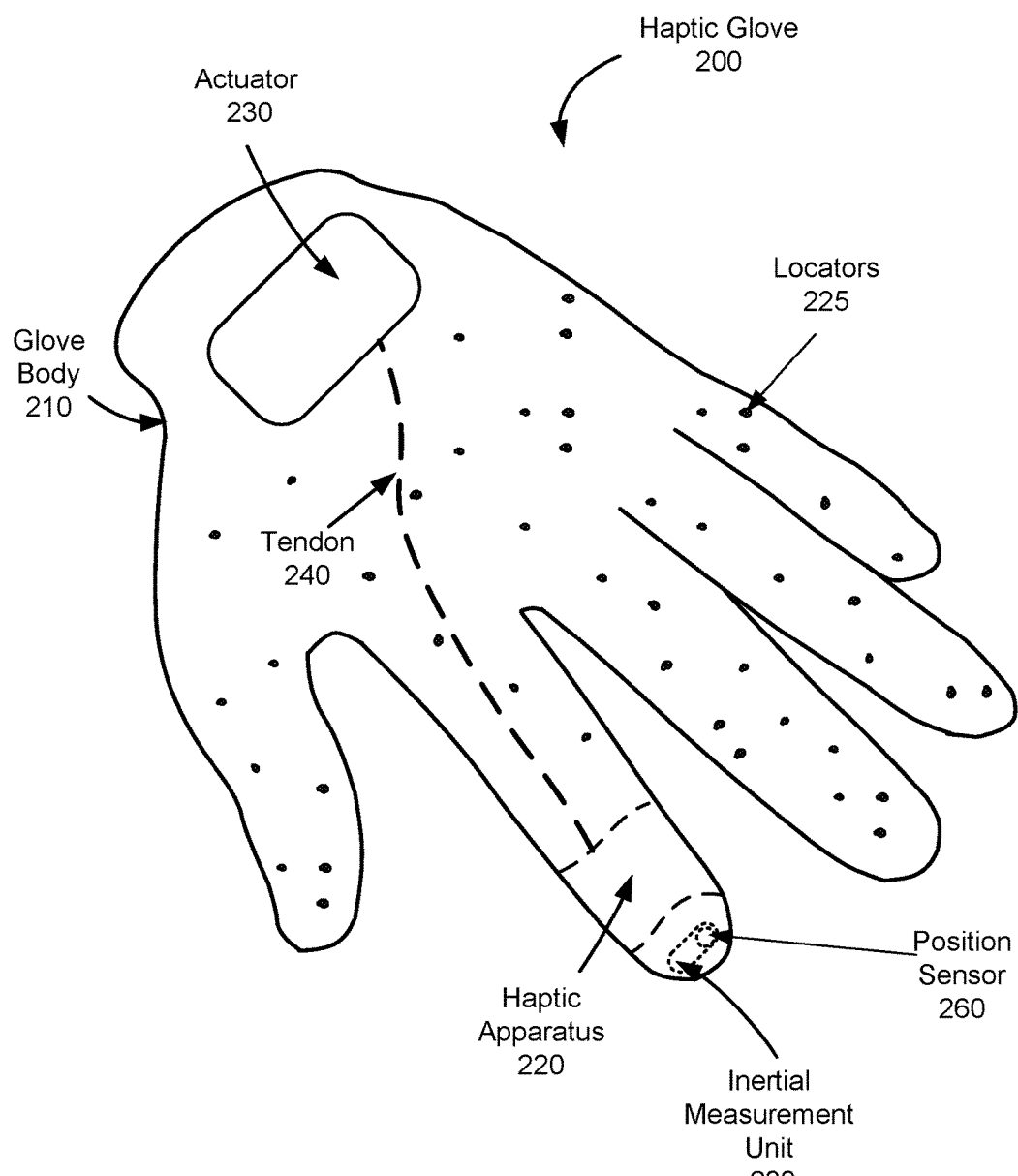
FIG. 2 is a perspective view of a haptic glove, in accordance with an embodiment.

FIG. 2 is a perspective view of a haptic glove 200, in accordance with an embodiment. In one embodiment, the haptic glove 200 includes a glove body 210, a haptic apparatus 220, an actuator 230, a tendon 240, locators 225, a position sensor 260, and an inertial measurement unit (IMU) 280. In some embodiments, the haptic glove 200 may be, e.g., the haptic assembly 140 of FIG. 1, the locators 225 may be e.g., locators 170 of FIG. 1; the position sensor 260 may be e.g., position sensor 175 of FIG. 1; and the IMU 280 may be e.g., the IMU 180 of FIG. 1. The user hand movement can be detected according to fast calibration data from the IMU 280 and/or slow calibration of the locators 225 from the imaging device 135. Moreover, haptic feedback including a rigidity of a virtual object can be provided to the user by the actuator 230, tendon 240, and haptic apparatus 220.

The glove body 210 is an apparatus covering a hand. The glove body 210 is a garment that is coupled to the sensor 260, the haptic apparatus 220, the actuator 230, and the tendon 240. In one embodiment, the sensor 260 is coupled to a corresponding tip of the glove body 210 (e.g., a portion corresponding to a fingertip); the haptic apparatus 220 is coupled to a corresponding finger portion (e.g., a portion corresponding to a distal phalanx) of the glove body 210; and the actuator 230 is coupled to a portion of the glove body 210 corresponding to a back of a hand (e.g., dorsal side). The tendon 240 is coupled between the actuator 230 and the haptic apparatus 220. In one embodiment, one or more of these components are placed beneath an outer surface of the glove body 210, thus are not visible from the outside. Additionally or alternatively, some of these components are placed on an outer surface of the glove body 210, and are visually detectable.

The glove body 210 illustrated in FIG. 2 is merely an example, and in different embodiments, the glove body 210 includes fewer, more or different components than shown in FIG. 2. For example, in other embodiments, there can be multiple haptic apparatuses 220 (e.g., one or more on each finger) and multiple tendons 240. In addition, in other embodiments, there may be multiple position sensors 260 provided. Also, in one or more embodiments, one or more haptic apparatuses 220 and the actuator 230 can be positioned in different places than shown in FIG. 2. For example, additional haptic apparatuses 220 and the sensors 260 are located at different parts of the glove body 210. For another example, the haptic apparatuses 220 are coupled to or wrap the entire fingers of the glove body 210. For another example, the actuator 230 is coupled to a different portion of the glove body 210 corresponding to, for example a wrist or a palm.

The locators 225 are objects located in specific positions on the glove body 210 relative to one another. The configuration and operation of the locators 225 are similar to the locators 170 of the haptic assembly 140 of FIG. 1. Therefore, the detailed description thereof is omitted herein for the sake of brevity.

A position sensor 260 generates one or more measurement signals in response to motion of the haptic glove 200. The configuration and operation of the position sensors 260 are similar to the position sensors 175 of the haptic assembly 140 of FIG. 1. Therefore, the detailed description thereof is omitted herein for the sake of brevity.

The IMU 280 is an electronic device that generates fast calibration data based on measurement signals received from one or more of the position sensors 260. Based on the one or more measurement signals from one or more position sensors 260, the IMU 280 generates fast calibration data indicating an estimated position of the haptic glove 200 relative to an initial position of the haptic glove 200. The configuration and operation of the IMU 280 are similar to the IMU 180 of the haptic assembly 140 of FIG. 1. Therefore, the detailed description thereof is omitted herein for the sake of brevity.

The haptic apparatus 220 provides haptic feedback emulating a user touching a virtual object with a corresponding rigidity. In one embodiment, the shape of the haptic apparatus 220 is actuated according to an actuation signal from the actuator 230. An actuation signal is a mechanical and/or electrical signal that causes the haptic apparatus 220 to adjust its shape. In one embodiment, the haptic apparatus 220 is coupled to a fingertip of the glove body 210. In another embodiment, the haptic apparatus 220 covers the entire glove body 210 or are placed on other parts (e.g., area corresponding to different phalanx) of the glove body 210. Example materials of the haptic apparatus 220 include silicone, textiles, thermoset/thermoplastic polymers, thin steel, or some combination thereof.

The actuator 230 modulates the haptic apparatus 220 according to a rigidity of a virtual object. The actuator 230 may be, e.g., an electric motor, or some other device that modulates one or more haptic apparatuses via corresponding tendons 240. Specifically, the haptic apparatus 220 can be modulated by the actuator 230 such that a smaller area of the haptic apparatus 220 applies pressure to the user hand (e.g., a finger) for emulating a user contacting a hard material. Likewise, the haptic apparatus 220 can be modulated by the actuator 230 such that a larger area of the haptic apparatus 220 applies pressure to the user hand for emulating a user contacting a soft material. In one embodiment, the shape of the haptic apparatus 220 is modified according to an actuation signal applied to change the area of the haptic apparatus 220 applying pressure to the user hand. In another embodiment, the shape of the haptic apparatus 220 is modified according to mechanical tension applied through the tendons 240, to change the area of the haptic apparatus 220 applying pressure to the user hand. Various structures and operations of the haptic apparatus 220 are described in detail with respect to FIGS. 3 and 4.

The tendon 240 passes an actuation signal from the actuator 230 to the haptic apparatus 220. A tendon 240 is a connective link to a haptic apparatus 220 that passes an actuation signal to a haptic apparatus 220. A tendon 240 may be, for example conductive materials for transferring electrical signals, tubes for transferring pneumatic pressure, mechanical linkages (e.g., strings, rods, etc.) for transferring mechanical actuation, some other connective link to a haptic apparatus 220, or some combination thereof.

In some embodiments, the actuator 230 receives a haptic feedback signal from the VR console 110, and actuates the haptic apparatus 220 accordingly. The actuator 230 generates an actuation signal based on the haptic feedback signal, and provides the actuation signal to the haptic apparatus 220 for actuating the haptic apparatus 220. In the embodiment in which the haptic feedback signal identifies a haptic apparatus 220 and a rigidity level to actuate the haptic apparatus 220, the actuator 230 converts the rigidity level to a corresponding actuation amount and actuates the haptic apparatus 220 identified by the haptic feedback signal. For example, the haptic feedback signal indicates the haptic apparatus (e.g., 220 of FIG. 2) corresponding to an index finger needs to be modulated to emulate a user touching a soft material, e.g., associated with a rigidity level below a threshold from a Rockwell scale. The actuator 230 converts the haptic feedback signal to generate an actuation signal causing the haptic apparatus 220 to deform such that a large area of the haptic apparatus 220 contacts the user finger. In the embodiment in which the haptic feedback signal identifies a haptic apparatus 220 and an amount of actuation, the actuator 230 actuates the haptic apparatus 220 as identified by the haptic feedback signal. The actuator 230 may apply, to the haptic apparatus 220, electrical signal, pneumatic pressure, or mechanical actuation as the actuation signal.

In one embodiment, the haptic glove 200 adjusts a shape of the haptic apparatus 220 for providing haptic feedback by applying fluidic pressure to the haptic apparatus 220. In one example, the actuator 230 is a pump or a valve array that adjusts pressure of fluid (or air), and the tendon 240 is a tube that transfers fluid (or air) from the actuator 230 to the haptic apparatus 220. The haptic apparatus 220 may be a bladder that can change its shape according to the fluid (or air) applied through the tendon 240 (e.g., tube) for providing haptic feedback to the user.

In another embodiment, the haptic glove 200 adjusts a shape of the haptic apparatus 220 for providing haptic feedback by applying electric signals to the haptic apparatus 220. In one example, the actuator 230 is a voltage or a current supplier that generates an electric signal (e.g., voltage or current), and the tendon 240 is a conductive wire that transfers the electric signal to the haptic apparatus 220. The haptic apparatus 220 may include conductive plates and one or more layers including piezo-electric materials between the conductive plates. According to the electric signal, electric fields are generated between the conductive plates. Moreover, a shape of the one or more layers including the piezo-electric materials is changed according to the electric fields for providing haptic feedback to the user.

Figure 3C:
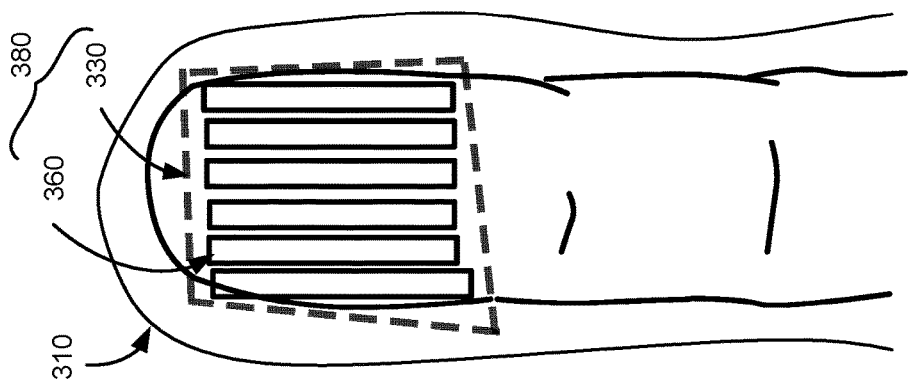
FIG. 3C is a cross section view of a portion of the haptic glove of FIG. 2, showing a haptic apparatus including a substrate coupled to a plurality of elongated sub-haptic apparatuses, in accordance with another embodiment.
Figure 3B:
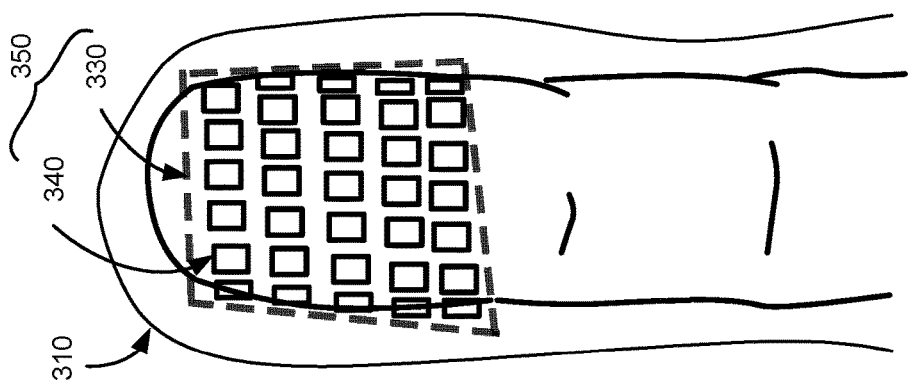
FIG. 3B is a cross section view of a portion of the haptic glove of FIG. 2 showing a haptic apparatus including a substrate coupled to a plurality of sub-haptic apparatuses, in accordance with another embodiment.
Figure 3A:
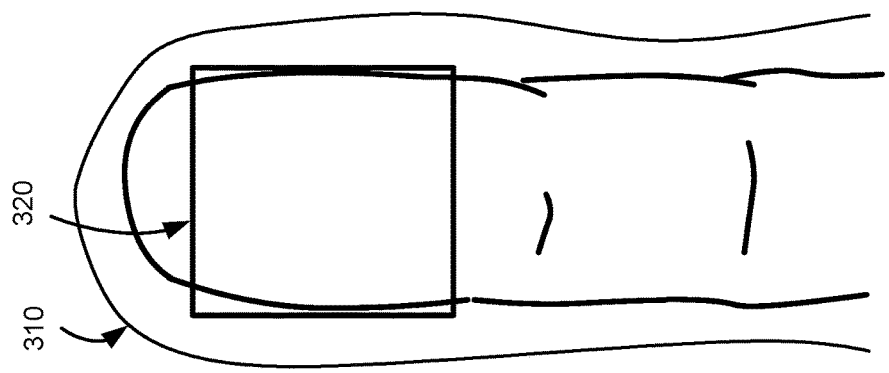
FIG. 3A is a cross section view of a portion of the haptic glove of FIG. 2 showing a haptic apparatus including a sheet, in accordance with an embodiment.

FIG. 3A is a cross section view of a portion of the haptic glove 200 of FIG. 2 showing a haptic apparatus including a sheet 320, in accordance with an embodiment. The haptic apparatus applies haptic feedback including a rigidity of a material according to an actuation signal from the actuator 230 of FIG. 2. The finger portion of the haptic glove in FIG. 3A includes a glove body 310 and the sheet 320 that is part of the haptic apparatus placed within the haptic glove body 310. In some embodiments, the glove body 310 is, e.g., the glove body 210 of FIG. 2 and the haptic apparatus is, e.g., the haptic apparatus 220 of FIG. 2. The rectangular sheet may be actuated to emulate touching a surface with a particular rigidity. The sheet 320 may be composed of, e.g., plastic, silicone, textiles, thermoset/thermoplastic polymers or some combination thereof. The sheet has a square shape. However, in other embodiments the sheet may have some other shape (e.g., oval, or rectangular shape). The finger portion of the haptic glove may also include one or more tendons 240 of FIG. 2, one or more position sensors 260 of FIG. 2, or conductive wires coupled to the sensors 260 that are not shown in FIG. 3A for simplicity.

FIG. 3B is a cross section view of a portion of the haptic glove 200 of FIG. 2 showing a haptic apparatus including a substrate 330 and a plurality of sub-haptic apparatuses 340, in accordance with another embodiment. The finger portion of the haptic glove in FIG. 3B includes a glove body 310 and a haptic apparatus 350 placed within the haptic glove body 310. The structure of haptic glove and the haptic apparatus 350 of FIG. 3B is similar to those of FIG. 3A, except the haptic apparatus 350 includes a substrate 330 and a plurality of sub-haptic apparatuses 340. The substrate 330 is a flexible material that may be actuated to emulate touching a surface with a particular rigidity. The material may be, e.g., flexible plastic, cloth, a composite of fabric and plastic or thermoset polymer materials, silicone, or some combination thereof.

A plurality of sub-haptic apparatuses 340 are coupled to the substrate 330. The sub-haptic apparatuses 340 are positioned on the substrate 330 in an array pattern, where each sub-haptic apparatus 340 includes a single sheet and actuated like the haptic apparatus of FIG. 3A. Each sub-haptic apparatus 340 can be identified by a corresponding coordinate (e.g., Cartesian coordinate). In one embodiment, each sub-haptic apparatus 340 has a square shape with a size of, for example, 1 mm×1 mm.

In other embodiments, each sub-haptic apparatus 340 can have other shapes (e.g., oval, or rectangular shape) with any dimension. According to a haptic signal (e.g., from the VR console 110) one or more of the sub-haptic apparatuses 340 indicated by the haptic signal can be modulated to emulate a user touching a certain rigidity of a virtual object. By disposing the sub-haptic apparatuses 340 in the array pattern and modulating a selected subset of the sub-haptic apparatuses 340, various types of haptic feedback can be provided to a user in a controlled area.

FIG. 3C is a cross section view of a portion of the haptic glove 200 of FIG. 2, showing a haptic apparatus including a substrate 330 including a plurality of elongated sub-haptic apparatuses 360, in accordance with another embodiment. The finger portion of the haptic glove in FIG. 3C includes a glove body 310 and a haptic apparatus 380 placed within the haptic glove body 310. The structures of haptic glove and the haptic apparatus 380 of FIG. 3C are similar to those of FIG. 3A, except the haptic apparatus 380 includes a plurality of elongated sub-haptic apparatuses 360 instead of the plurality of sub-haptic apparatuses 340 in an array. In FIG. 3C, the sub-haptic apparatuses 360 are elongated along a length of the fingertip. In other embodiments, the sub-haptic apparatuses 360 are elongated in a perpendicular direction of the length of the finger or in any direction (e.g., diagonal direction). According to the haptic signal from the VR console 110, one or more of the sub-haptic apparatuses 340 indicated by the haptic signal can be modulated to emulate a user touching a certain rigidity of a virtual object.

FIG. 4A illustrates a cross section view of a haptic apparatus 420 emulating a surface associated with a low rigidity, according to an embodiment. In some embodiments, the haptic apparatus 420 is the haptic apparatus of FIG. 3A, sub-haptic apparatus 340 of FIG. 3B, or sub-haptic apparatus 360 of FIG. 3C. In some embodiments, haptic apparatus 420 includes a sheet 430 and one or more plates 440 placed on the sheet 430 between the sheet 430 and the finger 410 of the user. The sheet 430 is an amenable plate that can be actuated along the direction 480, according to an actuation signal. The amount of actuation applied to the sheet 430 corresponds to a rigidity of a virtual object in contact with a user. According to the actuation, the area of the sheet 430 in contact with the user finger 410 through one or more plates 440 can be changed. In one embodiment, the plates 440 are of the same material as the sheet 430 and may be an extension of the sheet 430. Alternatively, the plates 440 are of a different material than the sheet 430. For example, the plates 440 may include inflatable flexible square or dome shape elements/micro vibration elements/silicone, urethane, or some combination thereof. In other embodiments, the plates 440 may be omitted, and the sheet 430 may directly contact the finger 410.

In FIG. 4A, the haptic apparatus 420 is actuated to provide haptic feedback to a user's finger that has a corresponding virtual finger touching a virtual surface associated with a low rigidity (e.g., a soft material). In FIG. 4A, the haptic apparatus 420 is actuated such that the haptic apparatus 420 (or the sheet 430) is curved and placed along a contour of a bottom surface of the finger 410. Thus, more plates 440 contact the finger 410 or a larger area of the haptic apparatus 420 contacts the finger 410. Hence, the user can perceive the tactile feeling of touching a soft material/surface.

FIG. 4B illustrates a cross section view of a haptic apparatus 420 emulating a surface associated with a high rigidity, according to an embodiment. In FIG. 4B, the haptic apparatus 420 is actuated such that the haptic apparatus 420 (or the sheet 430) is flattened and ends of the haptic apparatus 420 are detached from a bottom surface of the finger 410. Thus, fewer plates 440 contact the finger 410 or a smaller area of the haptic apparatus 420 contacts the finger 410. Hence, the user can perceive the tactile feeling of touching a hard material.

In some embodiments, the haptic apparatus 420 can be configured according to an amount of touch. In one example, when a user is barely or partially in contact with a virtual object, the haptic apparatus 420 may be actuated such that an area of the plates 440 in contact with the user is reduced, for example as shown in FIG. 4B. As the user performs an action to press the virtual object harder (e.g., push a finger towards the virtual object), the haptic apparatus 420 may be actuated such that the area of the plates 440 in contact with the user increases, for example as shown in FIG. 4A, according to the user action.

In one embodiment, when the user is not in contact with any material in a virtual space, the haptic apparatus 420 may be configured in a default configuration. The default configuration may be a predetermined configuration of the haptic apparatus 420 such that some or all of the haptic apparatus 420 contacts the finger 410. In one embodiment, the default configuration can be determined experimentally to provide the most natural feeling to a user, or a configuration from which the most noticeable change can be perceived by the user. In some embodiments, there are at least two pressure states. A pressure state describes an amount of pressure applied by some or all of the haptic apparatus 420 on the finger 410. A low pressure state may be used if no virtual surface is being contacted. In contrast, if a virtual surface is being contacted, a higher pressure state may indicate that the virtual surface is being touched, and the actuation of the haptic apparatus 420 is then used to emulate a rigidity of the virtual surface.

Figure 5:
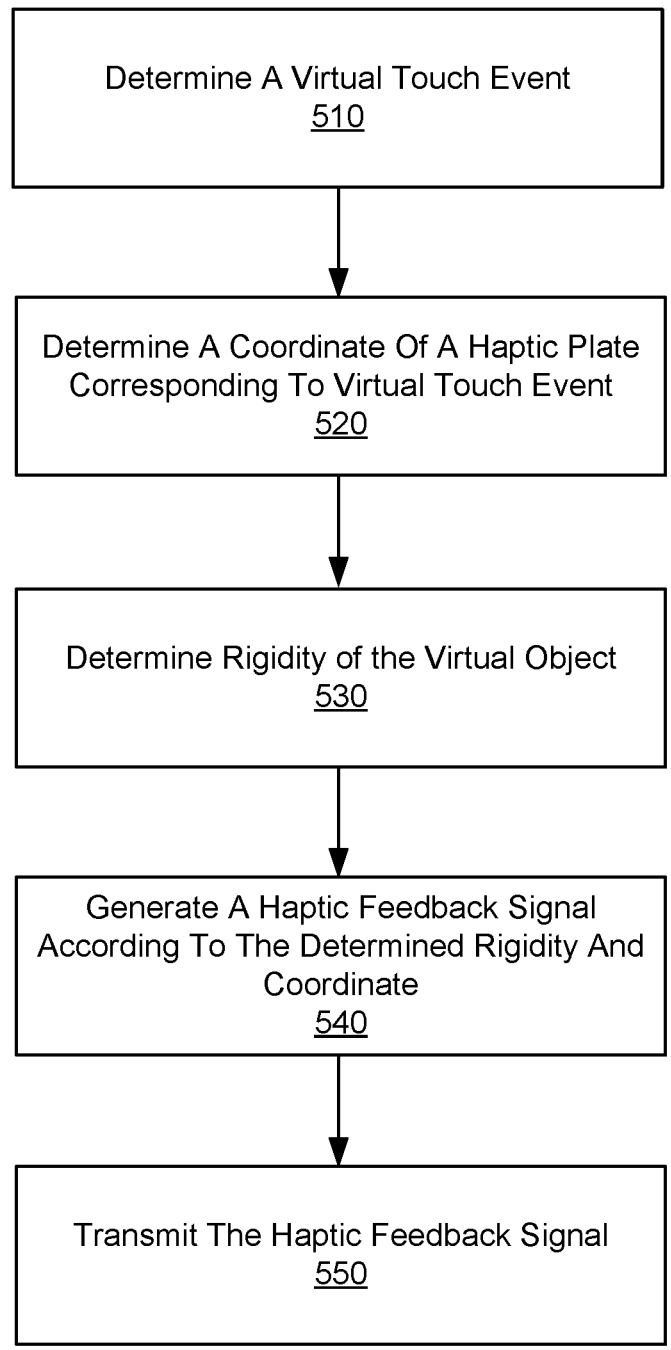
FIG. 5 is a flow chart illustrating a process of providing haptic feedback responsive to a virtual touch event in a virtual space, in accordance with an embodiment.

FIG. 5 is a flow chart illustrating a process of providing haptic feedback responsive to a virtual touch event in a virtual space, in accordance with an embodiment. In one embodiment, the process of FIG. 5 is performed by a console (e.g., VR console 110 of FIG. 1). Other entities may perform some or all of the steps of the process in other embodiments. Likewise, embodiments may include different and/or additional steps, or perform the steps in different orders.

The console determines 510 a virtual touch event. In one embodiment, the console receives fast calibration data from the haptic glove and/or slow calibration data from the imaging device, and then determines a hand movement. In one approach, the console obtains 3-D map of the user hand describing coordinates of various parts of the haptic glove in a virtual space corresponding to physical positions of the parts of the haptic glove in reality based on the fast calibration data and/or the slow calibration data. The console compares the coordinate of the virtual object in the virtual space and the coordinate of the haptic glove in the virtual space to determine whether a virtual touch event occurred. Responsive to determining the virtual touch event occurred, the console determines 520 a coordinate of a haptic apparatus corresponding to the virtual touch event. For example, responsive to the user pressing a plush ball in a virtual space with an index finger, the console determines such virtual touch event occurred, and identifies the haptic apparatus corresponding to the index finger.

The console determines 530 a rigidity of the virtual object. The rigidity of a virtual object can be obtained from a list of virtual objects and corresponding rigidities that are predetermined (e.g., via a look-up table). Continuing on the above example, the console determines a rigidity of the plush ball (e.g., '10' out of '100', where '100' indicates the highest rigidity).

The console generates 540 a haptic feedback signal describing details of the haptic feedback to be provided, according to the determined rigidity and coordinate. In one embodiment, the haptic feedback signal indicates which haptic apparatus should be actuated (e.g., a coordinate), and a rigidity level (or an amount of actuation corresponding to the rigidity level). Moreover, the console transmits the haptic feedback signal 550 to the haptic glove for providing the haptic feedback.

The haptic apparatus receives the haptic feedback signal, and then provides haptic feedback to the user according to the haptic feedback signal. In the embodiment in which the haptic feedback signal identifies a haptic apparatus 220 and a rigidity level to actuate the haptic apparatus 220, the actuator 230 converts the rigidity level to a corresponding actuation amount and actuates the haptic apparatus 220 identified by the haptic feedback signal. In the embodiment in which the haptic feedback signal identifies a haptic apparatus 220 and an amount of actuation, the actuator 230 actuates the haptic apparatus 220 as identified by the haptic feedback signal, as described in detail with respect to FIGS. 1 through 2.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A haptic assembly comprising:
   a glove body configured to cover a hand;
   a haptic apparatus coupled to the glove body, the haptic apparatus comprising three or more plates and a malleable sheet, the malleable sheet coupled to the three or more plates and the glove body, a portion of the three or more plates to contact the hand according to a shape of the malleable sheet; and
   an actuator coupled to the malleable sheet, the actuator configured to actuate, based in part on a rigidity of a virtual object, the malleable sheet to transform the shape of the malleable sheet to adjust an amount of direct contact area generated between a subportion of the three or more plates and at least a portion of the hand, wherein the haptic assembly comprises an operation mode wherein a subset of the three or more plates does not contact the portion of the hand based in part on the rigidity of the virtual object.

2. The haptic assembly of claim 1, wherein the actuator is configured to actuate the malleable sheet, responsive to a determination that a portion of the glove body corresponding to the haptic apparatus is in contact with the virtual object.

3. The haptic assembly of claim 2, wherein the actuator is further configured to actuate the malleable sheet in a configuration in which a larger subarray of an array of the three or more plates contacts the hand, responsive to a determination that the portion of the glove body is in contact with the virtual object associated with a soft material that has a rigidity level below a threshold value.

4. The haptic assembly of claim 3, wherein the malleable sheet is formed along a contour of a fingertip of the hand, an edge of the malleable sheet is bent closer to the contour of the fingertip, responsive to the determination that the portion of the glove body is in contact with the virtual object associated with the soft material.

5. The haptic assembly of claim 2, wherein the actuator is further configured to actuate the malleable sheet in a configuration in which a smaller subarray of an array of the three or more plates contacts the hand, responsive to a determination that the portion of the glove body is in contact with the virtual object associated with a hard material that has a rigidity level above a threshold value.

6. The haptic assembly of claim 5, wherein the malleable sheet is formed along a contour of a fingertip of the hand, an edge of the malleable sheet is bent farther away from the contour of the fingertip, responsive to the determination that the portion of the glove body is in contact with the virtual object associated with the hard material.

7. The haptic assembly of claim 2, further comprising:
   an inertial measurement unit coupled to the glove body, the inertial measurement unit configured to determine a physical position of the malleable sheet, wherein whether the portion of the glove body is in contact with the virtual object is determined based on a first coordinate of the virtual object in a virtual space and a second coordinate in the virtual space, the second coordinate corresponding to the physical position of the malleable sheet.

8. The haptic assembly of claim 1, wherein the three or more plates include a first plate and a second plate that are disposed in an array.

9. The haptic assembly of claim 1, wherein the three or more plates include a first plate and a second plate that are disposed in parallel along a direction.

10. The haptic assembly of claim 1, wherein the haptic apparatus is coupled to a portion of the glove body corresponding to a fingertip of the hand.

11. A haptic assembly comprising:
    a haptic apparatus comprising three or more plates coupled to a malleable sheet, a portion of the three or more plates configured to contact a part of a user according to a shape of the malleable sheet;
    an actuator configured to generate an actuation signal to actuate, based in part on a rigidity of a virtual object, the malleable sheet to transform the shape of the malleable sheet to adjust an amount of direct contact area generated between a subportion of the three or more plates and at least a portion of the hand, wherein the haptic assembly comprises an operation mode wherein a subset of the three or more plates does not contact the portion of the hand based in part on the rigidity of the virtual object; and
    a tendon coupled between the malleable sheet and the actuator, the tendon to transfer the actuation signal to the malleable sheet to actuate the malleable sheet.

12. The haptic assembly of claim 11, wherein the actuation signal is selected from a group consisting of: an electrical signal, a pneumatic pressure, and a mechanical actuation.

13. The haptic assembly of claim 11, wherein the actuator is configured to actuate the malleable sheet, responsive to a determination that the haptic apparatus is in contact with the virtual object.

14. The haptic assembly of claim 13, wherein the actuator is further configured to actuate the malleable sheet in a configuration in which a larger subarray of an array of the three or more plates contacts the part of the user, responsive to a determination that the haptic apparatus is in contact with the virtual object associated with a soft material that has a rigidity level below a threshold value.

15. The haptic assembly of claim 14, wherein the malleable sheet is formed along a contour of the part of the user, an edge of the malleable sheet is bent closer to the contour of the part of the user, responsive to the determination that the haptic apparatus is in contact with the virtual object associated with the soft material.

16. The haptic assembly of claim 13, wherein the actuator is further configured to actuate the malleable sheet in a configuration in which a smaller subarray of an array of the three or more plates contacts the part of the user, responsive to a determination that the haptic apparatus is in contact with the virtual object associated with a hard material that has a rigidity level above a threshold value.

17. The haptic assembly of claim 16, wherein the malleable sheet is formed along a contour of the part of the user, an edge of the malleable sheet is bent farther away from the contour of the part of the user, responsive to the determination that the haptic apparatus is in contact with the virtual object associated with the hard material.

18. The haptic assembly of claim 13, further comprising:
    an inertial measurement unit coupled to the haptic apparatus, the inertial measurement unit configured to determine a physical position of the malleable sheet, wherein whether the haptic apparatus is in contact with the virtual object is determined based on a first coordinate of the virtual object in a virtual space and a second coordinate in the virtual space, the second coordinate corresponding to the physical position of the malleable sheet.

19. The haptic assembly of claim 11, wherein the three or more plates include a first plate and a second plate that are disposed in an array.

20. The haptic assembly of claim 11, wherein the three or more plates include a first plate and a second plate that are disposed in parallel along a direction.

* * * * *